Inventors: Pieter Jan Schoenmakers
Willem L. van de Putte
By: *Oswald H. Milmore*
Their Attorney

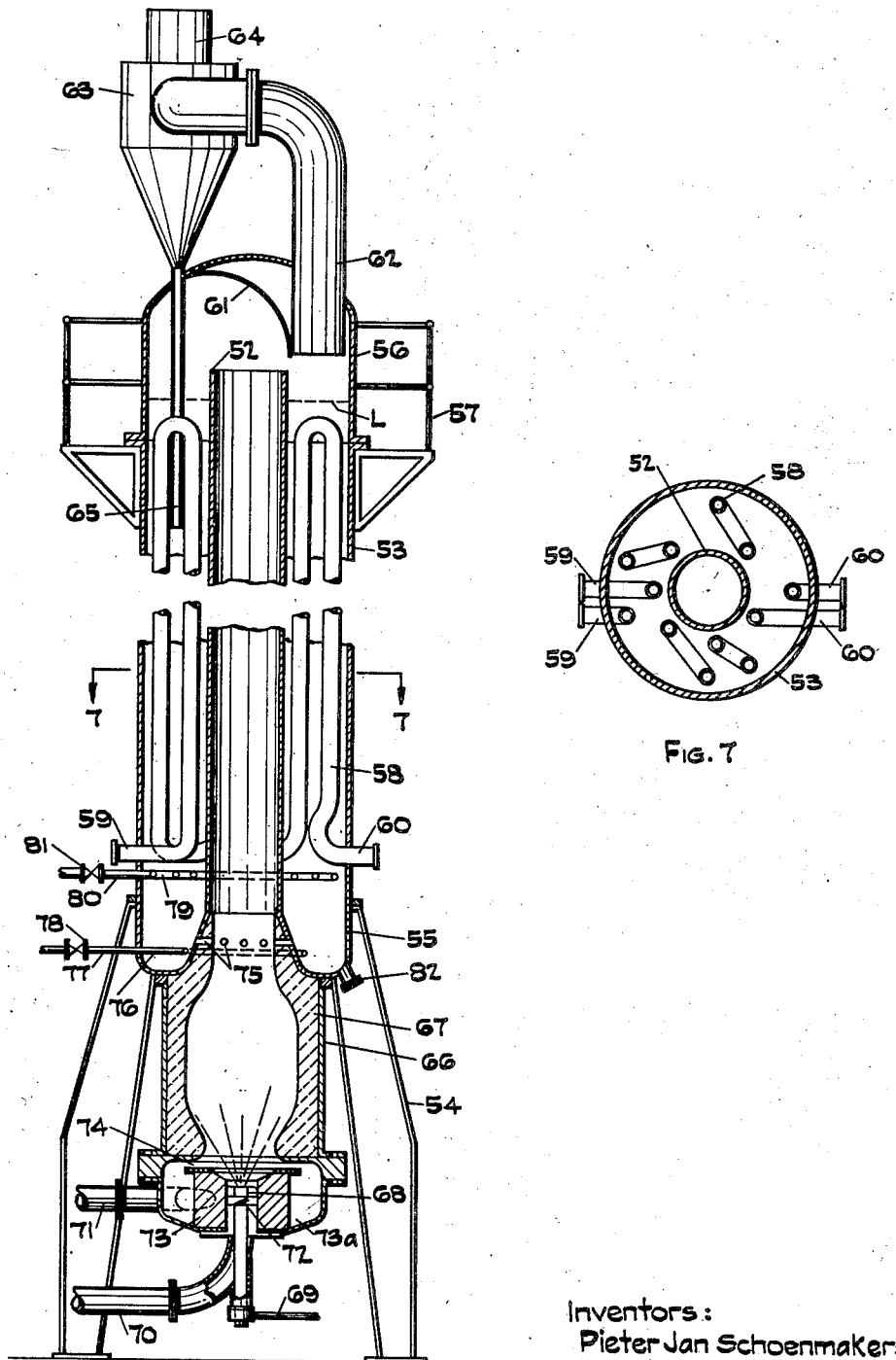

United States Patent Office 2,698,171
Patented Dec. 28, 1954

2,698,171

HEAT TRANSFER METHOD AND APPARATUS USING SEGREGATED UPWARDLY AND DOWNWARDLY FLOWING FLUIDIZED SOLIDS

Pieter Jan Schoenmakers and Willem L. van de Putte, Delft, Netherlands, assignors to Shell Development Company, Emeryville, Calif., a corporation of Delaware Application July 30, 1952, Serial No. 301,634

Claims priority, application Netherlands July 31, 1951

15 Claims. (Cl. 263—21)

This invention relates to an improved method and apparatus for transferring heat between a gas and a heat transfer wall, which may be the boundary wall of a vessel of any shape, such as a tube, containing a fluid such as a reacting mixture, wherein the heat is transmitted by means of finely divided solids that are transported in the fluidized state. The invention is applicable both to impart heat to such wall and, thereby, to the fluid or other substances on the other side thereof, in which case the gas is at a temperature higher than the said wall, and to abstract heat therefrom, in which case the said gas is at a lower temperature than the said wall.

In many processes it is desired to transfer heat between a gas and a heat transfer wall to maintain the latter at a desired temperature while at the same time carefully avoiding any overheating or over chilling of the wall. The direct passage of the said gas in contact with the heat transfer wall is often not practicable for the reason that the rate of heat transfer between the gas and the wall surfaces per unit temperature difference is so low that it becomese necessary to employ gas at a temperature that differs greatly from that of the wall. This leads to undesirable fluctuations in the temperature of the heat transfer wall when the demand for heat transfer changes for any reason. Thus, if the process is one in which heat is supplied to an endothermically reacting mixture flowing on the opposite side of the wall, a decrease in the flow rate requires that heat be transferred to the wall at a reduced rate, but the rate of heat transfer will in such case not be appreciably decreased until the wall has become excessively hot.

Far greater heat transfer coefficients are realized when the heat transfer wall is maintained in contact with a turbulent bed of solid particles that are fluidized by the said gas. Such high heat transfer coefficients make it possible to use lower temperature differences between the gas and the wall, resulting in smaller fluctuations in the wall temperature upon changes in demand for heat transfer. Also, such particles, being in a turbulent state, are continually being mixed and thereby produce a fluidized bed having a uniform temperature throughout, resulting in even temperature distribution throughout the region where heat is being transferred to the wall. Such uniformity in temperature often leads to decreased production of undesirable by-products in the process stream in contact with the heat transfer wall, e. g., it reduces the deposition of coke through local overheating in processes that are liable to carbonization, nad sometimes leads to a higher conversion efficiency.

A number of embodiments employing fluidized solids as heat transmission media are already known. In the usual method, also known as the direct method, the tube carrying the process stream and constituting the said heat transfer wall is immersed in a bed of finely divided solids that is maintained in a dense fluidized state by the gaseous medium which is used to heat or cool the said tube. Thus, the gas may be hot combustion gases from a burner situated outside of the bed or generated by combustion within the bed, or may be air that is supplied from the atmosphere and may be refrigerated. The solids are heated or cooled by contact with the gas and heat transfer takes place between the solids and the tube, accompanied with some additional direct transfer between the gas and the tube. The vertical depth of the fluidized bed in such installations is restricted by the cost of supplying gas at a pressure sufficient to maintain the solids fluidized throughout the height of the heat transfer wall, said pressure being proportional to the height of the fluidized bed and approximately equal to the weight of all solid particles divided by the cross sectional area of the bed. This usually leads to installations that are extended horizontally, requiring a large number of burners and leading to difficulties in maintaining the bed uniformly fluidized.

Also, chemical reactions have been carried out using so-called inverse-action fluidized systems, wherein the reactants are in the dense fluidized bed itself (the reactant being the fluidizing gas or the solids or both) and heat is supplied or abstracted by passage of a thermal fluid through tubes in contact with the fluidized bed. While such a system may lead to either horizontal or vertical installations, it is practically limited to the heating or cooling of gaseous media or for processes such as the gasification of solids.

The heat transmission medium has also been passed in a fluid state through the chamber to be heated or to be cooled to another chamber, wherein the heat transmission medium could be heated or cooled.

If it is desired to carry out the heating or cooling of the heat transmission medium in a vertical chamber according to the direct method it is necessary to overcome the pressure in such a chamber, as was noted above. In this case considerable energy will be required for compressing the gas that is used to supply or abstract the heat and additional gas, if any, that is admitted to maintain the bed in a fluidized state. If heating is carried out with combustion gases obtained by means of a burner or effected within the bed a further difficulty arises, namely, that even operation of the burner is not easy owing to the considerable back-pressure which must be overcome. Since this back-pressure is often fluctuating the flows of fuel and combustion air will vary not only in total but also in relative amounts, leading to the danger that the flame will be extinguished. Moreover, the uniformity of the temperature in the bed will prevent the application of different temperatures to different parts of the heat transfer wall, a condition that is sometimes desirable. Finally, in the direct method the difference between the inlet and outlet temperatures of the gas is limited, resulting often in an ineffective utilization of the heat or cold in the gas.

It is an object of the invention to provide an improved method and apparatus for transferring heat between a gas and a heat transfer wall wherein the transfer of heat between the gas and the heat-transmitting solids, as well as the transfer of heat between the solids and the wall, takes place in vertically elongated chambers without the disadvantages of high back pressure and difficulty in operating a burner, as noted above.

A further object is to provide an improved method and apparatus of the character indicated whereby it is possible to attain different temperatures and, hence, different rates of heat transfer rates at different parts of the heat transfer wall by solids that are maintained in the fluidized state.

Still another object is to improve the effective utilization of heat or cold of the gas in a fluidized bed heater.

According to the invention fluidized solids are employed as the heat-transmitting medium in an inverse-action system of heat transfer, that is, the heat transfer between the gas and the solids is effected in a first chamber and that between the solids and the heat transfer wall to be heated or cooled is effected in a second chamber. The method is carried out in apparatus providing two separate vertical chambers; the gas and solid particles are supplied to the bottom of the first chamber and passed upwardly at a velocity in excess of the terminal velocity of the particles, resulting in concurrent upward flow of the gas and solids as a dispersed suspension and in heat transfer between the gas and solids; the solids are separated from the gas upon emerging from the top of the first chamber and the solids are passed downwardly through the second chamber as a fluidized bed, preferably as a turbulent fluidized bed in contact with the heat transfer wall, thereby effecting heat transfer between the descending solids and the wall; the particles are then returned from the bottom of the second chamber to the bottom of the first chamber. When the particles are used to supply heat to the wall, the said gas may be hot combustion gases obtained by the combustion of a fuel, such as fuel gas, oil or solid fuel with air; it can be generated outside of the first chamber or consist in part of combustion gases produced by combustion of fuel within the first chamber.

The second chamber may be disposed either alongside of the first chamber or may surround the first chamber, as by mounting two cylindrical columns concentrically. The latter offers the advantage that the walls of the first, inner chamber require no refractory lining whilst, moreover, heat can be transmitted through this wall to the turbulent fluidized bed in the second chamber.

A "fluidized bed" is a mass of solid particles in a state of hindered settling in a gas, the mass exhibiting liquid-like mobility, hydrostatic pressure and an observable upper free surface boundary. A "turbulent fluidized bed" is a fluidized bed wherein the mobility of the mass is such that mixing takes place. Such beds are also known as a dense fluidized bed and a dense turbulent fluidized bed, respectively. A "dispersed suspension" is a mass of solid particles suspended in a current of gas rising past the particles, which differs from a fluidized bed in that an upper level or interface is not formed under conditions of continuous solids entrainment and uniform superficial velocity. Such a bed is also known as a dilute suspension to distinguish it from dense fluidized beds. For further details on the natures of these beds and the definitions of the terms, see "Fluidization Nomenclature and Symbols," Industrial and Engineering Chemistry, vol. 41, pp. 1249–1250, June 1949.

The pressure drop through the first vertical chamber, wherein the solid particles are transported as a dispersed phase, is only moderately higher than the pressure drop that would be encountered for passage of gas through the empty chamber, with no suspended solids, at the same flow velocity. For any given rate of admission of solid particles into the first chamber, the pressure drop increases with increasing gas velocities, and it is usually desirable to operate with the lowest velocities that will produce the dispersed suspension and transport it without undesirable pressure effects as considered below. For curves showing the effect of gas velocities on pressure drops in concurrent vertical flow, see "Two-Phase Fluid-Solid Flow" by Frederick A. Zenz, Industrial and Engineering Chemistry, vol. 41, pp. 2801–2806, December 1949. The total pressure drop through the first vertical chamber will usually be considerably smaller than the pressure drop that would be experienced if the solids were maintained as a dense turbulent fluidized bed to the same height, e. g., from about one-fifth to one-half. However, it should be noted that it is not merely a question of attaining low pressure drops, but one of reducing total compression costs. Hence, in certain instances where a relatively small amount of gas can be used to transport a given quantity of solids (as where low rates of heat transfer are involved or the gas has a temperature differing greatly from that of the solids) higher upward velocities may be necessary to transport the solids and they can be achieved by making the cross sectional area of the first chamber small; the pressure drop through the first chamber may in such case be close to or even exceed that of a dense fluid bed of the same height, but economies are yet possible due to the smaller quantities of gas involved in comparison to compression costs for maintaining the solids fluidized in a chamber of the somewhat larger horizontal area required to effect adequate contact with the heat transfer wall.

The minimum upward gas velocity required to produce a dispersed suspension in the first chamber is the terminal settling or balancing velocity for a single particle; this velocity is determined mainly by the particle size, the particle density and the gas density. In general, the gas velocities are advantageously somewhat above this minimum and velocities of at least 16 ft. per sec. will normally be used, the horizontal dimensions of the first chamber being chosen with a view to attaining such a velocity; in most cases it is desirable to attain even higher velocities, e. g., preferably above 26 to 40 ft. per sec. in the case of particles such as sand having diameters within the range 0.005 to 0.05 inch, and still higher velocities, such as 100 ft. per sec. may be used, particularly when the solids have larger diameters. By using high upward velocities a sufficient quantity of solids can be transported in the dispersed suspension without greatly affecting the pressure drop through the first chamber. Thus, when using a gas velocity that, although in excess of the terminal velocity approaches it too closely, there is a tendency toward pulsating pressures and irregular movement of the solids; for this reason it is advantageous to operate with gas velocities in excess of the terminal velocity, such excess being greater as the weight ratio of solids to gas in the dispersed suspension is increased. By way of specific illustration, it is usually advantageous to have the gas velocity above 1.1 times the terminal settling velocity when the weight ratio of solids to gas is 10, above 1.6 times the terminal settling velocity when the weight ratio is 60, and so on following a linear relation. However, excessive pressure drops are avoided by operating not too far above this minimum, e. g., not above 4.0 times the terminal settling velocity.

The dispersed suspension produced as described above has a large fraction of voids, usually well above 0.85, e. g., 0.88 to 0.99, depending, inter alia, upon the weight ratio of solids to gas. Surprisingly, it was found that the quantity of heat transmission medium can exceed in weight many times the quantity of the gas which conducts it upwards, even 40 to 80 times as much, although as was noted above it is feasible to use other ratios, preferably not below 15 but permissibly even lower, e. g., 10. Through this circumstance it is possible not only to handle a smaller volume of gas but also to bring about a substantial rise or fall in the temperature of the gas within the first chamber, thereby attaining somewhat better utilization of heat than in other fluidized bed heaters.

The fluidized bed in the second chamber containing the heat transfer wall has a markedly lower fraction of voids than the dispersed suspension, e. g., from 0.30 to 0.80. This suspension should be distinguished from a fixed bed or quiescent fluidized bed wherein little or no mixing of the particles takes place and wherein lower heat transfer coefficients with respect to the heat transfer wall prevail. To attain high heat transfer coefficients (e. g., 20 to 90 B. t. u. per sq. ft. per degree F. per hour) it is desirable to maintain a state of turbulence or mobility such that the particle Reynolds number is at least 2 and, preferably, above 5. The particle Reynolds number is a dimensionless number defined by the formula:

$$\frac{Du\rho}{\mu}$$

wherein $D$ is the particle diameter, $u$ is the velocity of the particle with respect to the fluidizing gas, $\rho$ is the density of the gas and $\mu$ is the viscosity of the gas, all in consistent units. The second vertical chamber should be greater in cross sectional area than the first so that the solid particles do not pack too rapidly in to form a fixed bed. The descending particles may be maintained in a high state of turbulence by admitting fluidizing gas into the lower part of the second chamber, but this is not in every case essential. This fluidizing gas, when used, needs to be applied only in relatively small quantities, so that relatively little energy is required for this purpose, and the flow between solids and the fluidizing gas is counter-current.

It was found that back mixing of particles in the second chamber, that is, mixing between particles at different levels, takes place only to a limited extent, and that a considerable temperature gradient can be realized in this chamber. Thus, when the heat transfer wall is being heated, the particles in contact with the lower part thereof are cooler than those at the top, the reverse being the case when the wall is being cooled. This feature may in certain cases be put to advantage, e. g., in the first embodiment to be described.

Having now indicated the nature of the invention in a general way, reference is made to the accompanying drawings forming a part of this specification and illustrating by way of example certain preferred specific embodiments of the apparatus suitable for carrying out the method, wherein:

Figure 1 is a vertical sectional view of a heater according to one embodiment of the invention, employing individual chambers spaced from each other;

Figures 2 and 3 are horizontal sectional views taken on section lines 2—2 and 3—3, respectively, of Figure 1;

Figure 6 is a vertical sectional view of a heater according to further embodiment, employing concentrically arranged chambers; and Figure 7 is a horizontal sectional view taken on section line 7—7 of Figure 6.

Figure 1:
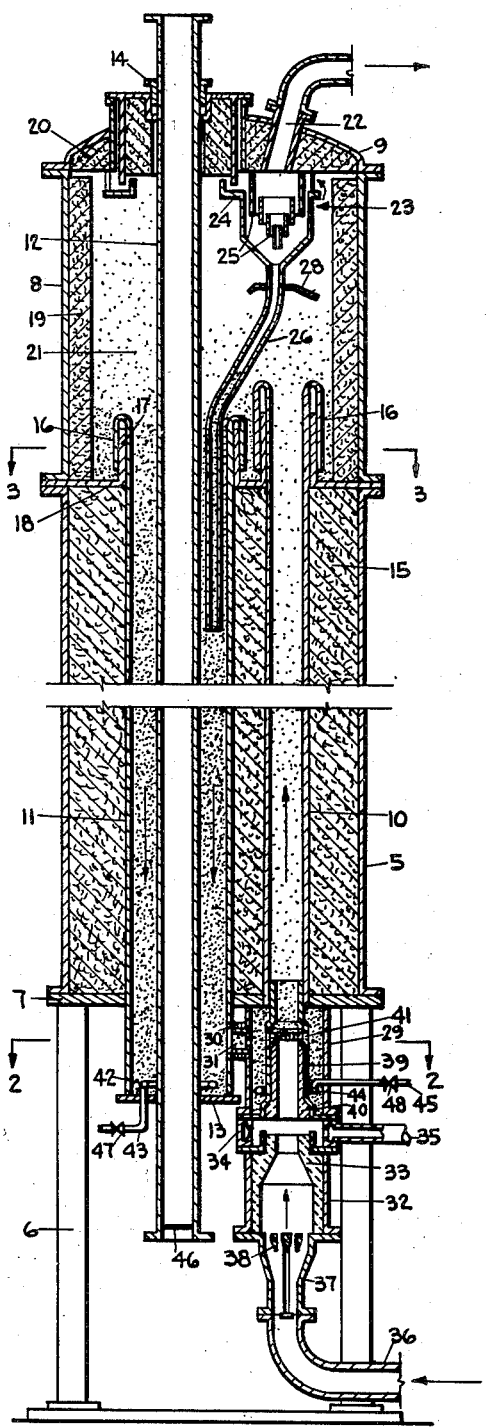

Referring to Figures 1 to 4, 5 is a vertically elongated column supported by pedestals 6 and having a base plate 7 forming a bottom closure, an upper column section 8, and an upper dome 9. Mounted on the base plate above a circular hole therein is a riser tube 10 defining within itself a first vertical chamber. Also supported by the base plate but extending through a second circular hole therein is a fluidized bed tube 11 defining within itself a second vertical chamber. The heat transfer wall is formed as a single flow or reaction tube 12 situated concentrically within the tube 11 and extending beyond the ends thereof, it being understood that any number of such tubes may be provided. Tube 12 is supported at the bottom by a plate 13 forming a closure for the tube 11, and at the top by a stuffing-box 14 that permits relative vertical movement between the tube and dome 9 to allow for expansion. The upper ends of the tubes 10 and 11 terminate at the lower part of the upper column section 8 and are provided with sand seals that permit vertical movement between the tubes and the column while preventing sand or other solid used as the heat transmitting medium from entering into the heat-insulating material 15, such as slag wool, that fills the space between the column 5 and the tubes 10 and 11. The sand seal may comprise down-turned annular collars 16 at the tops of the tubes having sliding fits with tubular projections 17 sealingly carried by a partition plate 18 that is clamped between the upper and lower column sections. The upper section and dome are provided with heat-insulating material 19, 20, arranged to leave a disengaging space 21 of enlarged cross-sectional area, wherein the gas flows at reduced upward velocity.

Gas is removed from the column through a flue duct 22 and suitable means of any desired type are preferably provided for separating from the gas such solids as are not settled out within the disengaging space. It is preferred, although not necessary, to locate the disengaging means within the disengaging space. In the embodiment illustrated the disengaging means is a louvre separator 23 having an annular bottom plate 24 situated above the bottom end of the duct 22 and spaced from the top of the disengaging space to admit gas as shown by the arrow. A series of louvres 25 at the bottom of the duct 22 constrain the escaping gas to make sharp changes in direction to separate the entrained solids, which fall down into a dip-leg 26 that extends into the tube 11 well beneath the bottom thereof so as to prevent the upflow of gas from the latter through the dip-leg. A deflector plate 28 made of high quality heat-resisting steel alloy is mounted above the riser tube 10 and may be supported by the dip-leg.

Figure 4:
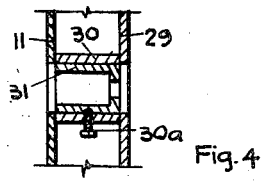
Figure 4 is a fragmentary view of a detail.

Mounted directly beneath the riser tube 10 is a cylindrical lift pot 29 having a diameter somewhat larger than that of the riser tube and communicating with the bottom of the fluidized bed tube 11 through a duct 30 that contains an insert 31 with a restricted passageway for limiting the sand circulation rate. The insert may be replaced as necessary to provide a passageway of required size and secured by a set screw 30a as shown in Figure 4. The burner comprises a combustion chamber 32 having a refractory ceramic lining 33 and mounted in spaced relation to the lift pot 29 by a spacer ring 34; the latter has a duct 35 through which compressed secondary combustion air can be admitted. A combustible mixture of compressed primary combustion air and fuel with suitable pressure, e. g., gaseous fuel, is admitted to the bottom of the combustion chamber through a duct 36, diverging burner duct 37, and a plate 38 providing a plurality of annular slits. It should be understood that other types of burners, e. g., those using liquid or solid fuel, may be used if desired. Immediately above the lining 33 and spaced vertically above it to provide an annular space for the entry of secondary air is a lift pot tube 39 extending upwards through the base plate 7 and lined internally with ceramic refractory 40. The lift pot tube has a plurality of small holes 41 for the radially inward flow of sand. The annular space within the lift pot and outside the lift pot tube forms an auxiliary chamber for the supply of sand.

Fluidization air may be admitted to the bottom of the tube 11 through a perforated torus-shaped distributing tube 42 from an air duct 43 at a rate controlled by flow control valve 47. A similar distributor 44 is situated in the bottom of the lift pot and is supplied with regulating fluidization air from an air duct 45 at a controlled rate determined by a flow control valve 48.

The reaction tube 12 may in certain applications carry reactants maintaining solid catalyst in a fluidized condition or carry solid catalyst in a liquid; it may in such case be provided with a catalyst carrier-grid 46.

The required amount of finely divided solids, e. g., sand, is charged into the device, e. g., through the duct 22 and collects in the tube 11. To start the heater the following procedure is followed:

Primary and secondary combustion air are admitted through the ducts 36 and 35, respectively, and main fluidization gas, e. g., air, is admitted to the fluidized bed tube 11 through the duct 43. Regulating fluidization gas, e. g., air, is admitted to the lift pot 29 through the duct 45. As a consequence the body of sand in the tube 11 is expanded and may be completely fluidized. Sand now starts flowing from this tube through the restricted passageway of insert 31 into the lift pot and, being fluidized in the latter, enters the lift pot tube 39 through the holes 41. It is thereupon entrained by the ascending gas to form a dispersed suspension. The flow of sand may be observed by means of a pressure gage (not shown) in the combustion chamber. A suitable ignition device (not shown) is then placed in operation after which fuel is admitted through the duct 36, the ignition device being thereafter turned off.

Direct-contact heat exchange between the combustion gases and the sand takes place efficiently in the riser tube, resulting in a practically homogeneous temperature of the dispersed suspension in the disengaging space 21. The dispersion emerging from the top of the riser tube is deflected by the plate 28 and most of the sand falls down into the fluidized bed tube 11, while the remainder of the sand, entrained by the gas, is caught in the louvre separator 23 and returned to the tube 11 through the dip leg 26.

In descending through the tube 11 the sand is in the state of a turbulent fluidized bed and transfers heat to the reaction tube 12. After the circulation has begun the rate of air admission through the duct 43 can usually be decreased or even shut off entirely, depending upon the degree of turbulence desired. Since, as was noted above, a high state of turbulence promotes high heat transfer rates, the rate of heat transfer may to a certain extent be regulated by control of the rate of flow of fluidization air by a flow control valve 47. The rate of sand circulation can be controlled, apart from changing the size of the restricted passageway at 31, by varying the rate of regulating fluidization air admitted to the lift pot through the duct 45 by means of a flow control valve 48. It is evident that the fluidization air supplied through the ducts 43 and 45 may be pre-heated or pre-cooled, if desired, and may consist in whole or in part of flue gas or combustion gases.

To shut down the heater, the fuel supply and primary air supply are shut off first, followed by shut-off of the main and regulating fluidization air to stop the admission of sand into the lift pot and lift pot tube. The flow of primary air is stopped simultaneously with the fuel supply to avoid spalling the refractory ceramic lining; however the flow of secondary air is continued at the maximum rate in order to prevent sand in the riser tube from falling down into the burner. When the pressure gauge in the combustion chamber shows that no more sand is circulating the secondary air supply is shut off.

The apparatus may be used for a variety of purposes, including the supply of heat to and the removal of heat from a process stream that is passed through the reaction tube either in the upwards or downwards direction, or in alternate upwards and downwards directions when several tubes are provided, as illustrated in Figures 6 and 7. Thus, a constant boiling mixture of isopropyl alcohol and water may be passed through the tube 12, which may contain plate-like brass bodies, to produce acetone and hydrogen by a highly endithermic reaction; or water may be passed through the tube to generate steam. It is understood that when used to abstract heat, for example, from an exothermically reacting process stream, no fuel need be admitted and the gas admitted through the duct 35 and/or 36 may be atmospheric air or air that has been refrigerated by passage through a cooling tower or the like.

With this apparatus it is possible to realize a temperature gradient within the fluidized bed tube 11, since the sand or other solid particles are admitted to the top at the temperature of the escaping gas, being progressively cooled when used to heat the tube 12 and progressively warmed when used to cool the tube 12, during passage downward through the tube 11. The temperature difference between the sand at the top and bottom of this tube is mainly dependent upon the weight ratio of the sand to the heating or cooling gas in the riser tube 10, assuming a constant rate of flow and temperature for the gas, e. g., that the type and amount of fuel and the flow of primary and secondary combustion air are kept constant. By adjusting the valve 48 to increase the rate of sand circulation the temperature gradient in the tube 11 may be decreased, while a decrease in the rate of sand circulation increases the temperature gradient. Owing to the high ratio of the height of the fluidized bed tube 11 to the effective cross-sectional area thereof as backmixing of sand between the bottom and top of the tube 11 will be more or less restricted, which, in combination with the high heat transfer from the fluidized bed to the reaction tube 12 can give rise to a temperature gradient along the height of the bed. In general, to include the case of non-circular chambers, e. g., that of Figures 6 and 7, it may be said that the heights are usually over 10 times the square root of the area of the second chamber (excluding portions occupied by the reaction tubes) and may be 50 or more times the said square root.

Such a controlled temperature gradient is useful for obtaining the desired heating profile of the process stream in the reaction tube, since the heat requirements of such streams often vary as the reaction proceeds. Thus, in the conversion of isopropyl alcohol to acetone a highly endothermic reaction occurs, the heat requirements of which decrease as the conversion proceeds. When the reaction mixture flows downwards through the reaction tube a lower rate of heat transfer to the reaction mixture occurs toward the later stages of the reaction, within the lower parts of the reaction tube. This concurrent flow of the process stream and heat transmission medium is opposite to the customary countercurrent flow and requires a somewhat higher temperature at the top of the heater (lower when the apparatus is used as a cooler) than in countercurrent flow, but is advantageous when a close control of the heating profile is desired. On the other hand, when increased heating or cooling is desired toward the end of the reaction the process stream would be passed upwards through the reaction tube. Finally, the invention is not limited to flow of the process stream once through the height of the fluidized bed in one or more special parallel tubes, as will be explained in connection with Figures 6 and 7.

A wide variety of solid materials may be used; it is desirable to grade the particles to exclude particles differing widely from the mean particle diameter. Sand is preferred although other solids, such as metal oxides of the type used as catalysts may be used. By avoiding the use of extremely fine particles the recovery of the solid from the gas in the separator 23 is facilitated, while excessively large particles require the use of correspondingly high upward gas velocities in the riser. Without limiting the invention thereto, it may be stated that graded sand having particle diameters from about 0.005 to 0.10 inch is preferred. Thus, a typical sand may consist of particles 95% of which have diameters above 0.007 inch and below 0.010 inch.

Figure 2:
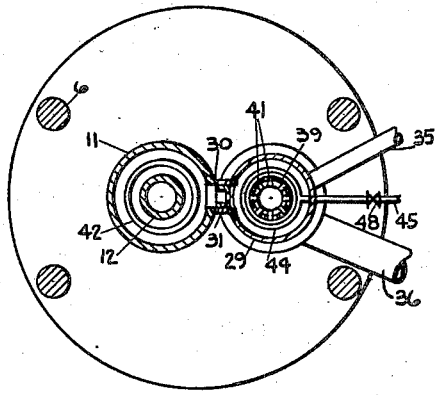
Figure 3:
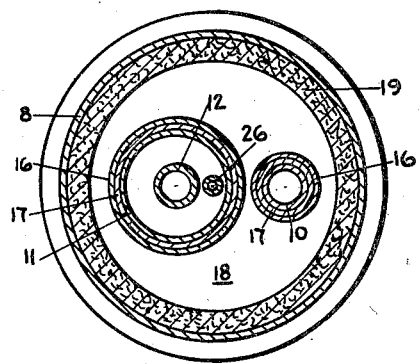

*Example.*—A heater constructed as shown in Figures 1–3, wherein the tubes 10 and 12 were 3 inches in diameter and the tube 11 9 inches in diameter and the height of the tube 11 above the base 7 was 24 ft., was operated as follows using water as a process stream to produce steam and employing sand with a mean particle diameter of 0.007 inch:

| | |
|---|---:|
| Main fluidization air through distributor 42, at 12.8 p. s. i. gauge_____lbs./hr__ | 19.2 |
| Regulating fluidization air through distributor 44, at 5.7 p. s. i. gauge_____lbs./hr__ | 11.5 |
| Total combustion air_____lbs./hr__ | 291 |
| Fuel (commercial propane)_____lbs./hr__ | 17 |
| Total gas flow in tube 10___lbs./hr__ | 319.5 |
| Sand circulation rate (calculated)__lbs./hr__ | 4,400 |
| Pressure drop through burner__in. of water__ | 6.30 |
| Pressure drop through riser tube 10 in. of water__ | 6.70 |
| Pressure drop through louvre separator 23_____in. of water__ | 1.00 |
| Total pressure drop___in. of water__ | 14.00 |
| Top sand temperature_____° F__ | 964 |
| Bottom sand temperature_____° F__ | 744 |
| Stack temperature_____° F__ | 968 |
| Calculated calorific heat value of fuel B. t. u./hr__ | 339,000 |
| Heat transferred to stream in reaction tube 12_____B. t. u./hr__ | 196,500 |
| Temperature of process stream passed upwards through tube 12: | |
| Inlet _____° F__ | 63 |
| Outlet _____° F__ | 958 |

Figure 5:
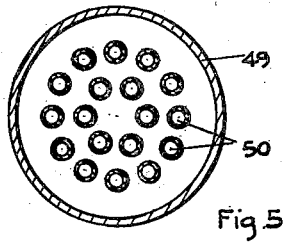
Figure 5 is a horizontal sectional view of a modified arrangement of the tubes in the second chamber.

Figure 5 shows a modified arrangement of the reaction tubes, suitable when a greater area of heat transfer wall is to be provided. In this embodiment the second vertical chamber is formed by a cylindrical shell 49 having a plurality of vertical flow tubes 50. By way of specific example, the shell 49 may be 39 inches in internal diameter and 36 ft. high and contain 18 tubes 50, each with external diameters of 4 inches, providing a total surface of about 646 sq. ft., which can be heated or cooled by circulating about 70 tons of sand per hour.

A particularly efficient construction is achieved by mounting the first and second chambers concentrically, as shown in Figures 6 and 7. The first vertical chamber, defined by the riser tube 52, is on the inside and the second vertical chamber is annular and between the tube 52 and an outer tube 53. These tubes are mounted on pedestals 54 and the bottom of the second chamber is closed by an annular trough-shaped closure 55. The top of the outer tube carries a top section 56 enclosing a disengaging space and having a dome that is integral therewith and forms a top closure for both chambers. The inner tube 52 extends into the upper section, about which there may be a gallery 57 for workmen. The outer tube 53 may be thermally insulated by lagging, not shown but indicated in Figs. 1–3. The flow or reaction tubes 58 are situated in the annular second chamber and may be arranged in any desired manner. For purposes of illustration the tubes are shown arranged vertically and connected at top and bottom to form two parallel continuous passages for the process stream from the entry points 59 to the discharge points 60. The dome carries a curved deflector 61 made of erosion-resistant and heat-resistant alloy steel, disposed to deflect the ascending dispersed suspension away from the space above the inner tube, and require gas entering the bottom of the discharge duct 62 to make a change of direction, whereby most of the solids are separated. A cyclone 63 is mounted above the dome and receives gas tangentially from the duct 62. Stack gases, freed from remaining solids, are discharged through a stack 64 and solids are returned to the second chamber by a dip-leg 65 that extends well below the level of the fluidized bed therein, indicated at L, slightly below the top of the tube 52.

The gas generator comprises a combustion chamber defined by a cylindrical vessel 66 mounted on the bottom of the closure 55 and lined with ceramic refractory material 67, and a burner head comprising a fuel oil atomizer 68 supplied from an oil line 69 and connected to a primary combustion air duct 70 and a secondary air duct 71. Primary combustion air is swirled by inclined vanes 72 during passage as an annular stream about the atomizer and within an annular block 73 and the secondary air is led tangentially into an annular swirl chamber 73a from which it flows radially inwardly with increased rotational velocity through a narrow annular passageway 74. A suitable ignition device, not shown, may be provided.

A plurality of sand inlet ports 75 at the top of the combustion chamber wall extend radially into the closure trough 55, slightly above the bottom thereof. A perforated, torus-shaped air distributor 76 is situated at the bottom of the trough to the supply auxiliary air for regulating the sand circulation rate; it is supplied with compressed air through a duct 77 at a rate controlled by a flow control valve 78. A main fluidization air distributor 79, comprising three annular perforated pipes, is situated in the annular second chamber above the ports 75 and beneath the tubes 58; it is supplied with compressed air through a duct 80 at a rate controlled by a flow control valve 81. An outlet 82 permits sand to be withdrawn or charged.

The operation of this heater is similar to the one previously described. Liquid oil, atomized by the atomizer 68, is burned in air admitted through ducts 70 and 71 to produce combustion gases that flow up through the inner vertical chamber of tube 52; they entrain sand entering through the ports 75 to form a dispersed suspension and effect heating of the sand by direct heat exchange. Most of the sand drops out of suspension when the gas velocity is decreased upon entering the enlarged disengaging space above the tube 52; the remainder of the sand is separated out in the cyclone 63. The separated sand flows downwards through the annular, second vertical chamber between tubes 52 and 53 as a turbulent fluidized bed in contact with the tubes 58, thereby transferring heat thereto by direct heat exchange. The descending sand is fluidized by admitting fluidization air through the distributor 79. The part of the trough 55 below this distributor forms an auxiliary chamber for the supply of sand to the first chamber; the sand accumulates in this auxiliary chamber as a fixed bed or as a quiescent fluidized bed, depending upon the rate of air admission through the distributor 76; by regulating this flow the rate of sand circulation can be regulated.

The lift pot and the control of the circulation of solids are claimed in our continuing application Serial No. 378,504, filed September 4, 1953.

We claim as our invention:

1. Method of transferring heat between a gas and a heat transfer wall comprising the steps of: feeding finely divided solids to the bottom of a first, confined vertical chamber; supplying said gas to the bottom of said chamber and flowing the said gas upwardly therethrough at a velocity sufficient to carry said solids progressively upwards in a dispersed suspension and thereby effecting heat transfer between the ascending gas and the ascending solids; separating the solids from the gas after upward flow through said chamber; admitting the separated solids to the top of a second, confined vertical chamber containing the said heat transfer wall; and separately fluidizing and flowing the said admitted solids downwardly through said second chamber in the state of a fluidized bed and in contact wtih said heat transfer wall and thereby effecting heat transfer between the descending solids and the said wall.

2. Method according to claim 1 wherein the quantity by weight of the solids fed to the first chamber is at least 20 times the quantity by weight of the gas supplied thereto.

3. Method according to claim 1 wherein heat is transferred to said wall, and the said gas is supplied by burning fuel in air under pressure outside of said chambers and admitting the resulting combustion products upwardly into said first chamber.

4. Method according to claim 1 wherein the solids are flowed downwardly through said second chamber in the state of a turbulent fluidized bed with a particle Reynolds number in excess of 2 by admitting a fluidizing gas into said second chamber at a lower part thereof and withdrawing the fluidizing gas at the top of the second chamber.

5. In combination with the method according to claim 1, the steps of using said solids, after downward passage from said second chamber as the source of the said solids fed to the bottom of the first chamber and regulating the rate of flow of said solids into the first chamber to control the temperature gradient of said heat transfer wall.

6. The method according to claim 1 wherein said second chamber surrounds the said first chamber, whereby said dispersed suspension ascends centrally and the separated solids descend through the second chamber as an annular fluidized bed surrounding the first chamber.

7. Method of transferring heat between a gas and a vertically elongated heat transfer wall comprising the steps of: feeding finely divided solids to the bottom of a first, confined vertical chamber; supplying said gas to the bottom of said chamber and flowing the said gas upwardly therethrough at a velocity in excess of the particle velocity for a solid single particle to carry said solids progressively upwards in a dispersed suspension and thereby effecting heat transfer between the ascending gas and the ascending solids; separating the solids from the gas after upward flow through said chamber; admitting the separated solids to the top of a second, confined vertical chamber having a height more than ten times the square root of the cross sectional area thereof and containing the said heat transfer wall throughout at least the major part of said height; flowing the said admitted solids downwardly through said second chamber while admitting fluidizing gas to a lower part of said second chamber at a rate to maintain the descending solids in the state of a turbulent fluidized bed in contact with said heat transfer wall and thereby effecting heat transfer between the descending solids and the said wall; and using said solids, after downward passage through said second chamber, as the source of the said solids fed to the bottom of the first chamber.

8. Apparatus for transferring heat between a gas and a heat transfer wall comprising, in combination: a first vertical chamber of restricted cross sectional area for the upflow of said gas at high velocity; a second vertical chamber containing said heat transfer wall; said chambers being in communication at the upper ends thereof for the flow of solids from the first chamber into the second chamber and thence downwardly through the second chamber; outlet means for discharging gas from the tops of the said chambers; means for feeding heat transmitting material in the form of finely divided solids to the bottom of said first chamber; means for supplying said gas to the bottom of said first chamber at a rate sufficient to cause upflow of the gas through said first chamber at a high velocity to carry said solids progressively upwards as a dispersed suspension whereby heat exchange is effected between said gas and said solids; means for fluidizing solids descending the second chamber in contact with said heat transfer wall whereby heat exchange is effected between said solids and said heat transfer wall; and means for withdrawing said solids from the bottom of the second chamber.

9. Apparatus according to claim 8 wherein the means for feeding solids to the first chamber includes direct means for returning said solids from the bottom of the second chamber to the first chamber and means for controlling the rate of return of said solids.

10. Apparatus according to claim 8 wherein the said first chamber comprises a central riser tube and the second chamber is annular and enclosed by an annular vertical wall surrounding the said riser tube.

11. Apparatus for heating a process stream comprising, in combination: a riser tube of restricted cross sectional area defining a first chamber; a burner beneath said riser tube having means for the supply of fuel and combustion air under pressure and communicating with said riser tube for the upflow of combustion products through said tube; passageways above said burner and at the bottom of said riser tube for feeding into said combustion products a heat transmitting material in the form of finely divided solids for upflow with said combustion products through said riser tube as a dispersed suspension and heat exchange therewith; a wall structure defining a second vertical chamber having a greater horizontal area than said riser tube; means at the top of the second chamber communicating with the top of said first chamber for the transfer of solids from the first chamber into the second chamber for downflow therethrough; gas outlet means for the tops of said first and second chambers; one or more flow tubes in said second chamber for the passage therethrough of said process stream; gas admission means in the second chamber for fluidizing the solids descending in the second chamber in contact with said flow tubes, whereby heat exchange is effected between said solids and said flow tubes; and means for withdrawing solids from the bottom of said second chamber.

12. The apparatus according to claim 11 wherein said passageways for feeding heat transmitting material are in flow communication with said second chamber to receive said solids after descent therethrough, in combination with means for regulating the rate of flow of said solids through said passageways.

13. The apparatus according to claim 11 wherein said passageways for feeding heat transmitting material are in flow communication with said second chamber at points beneath said gas admission means thereof to receive said solids after descent through the second chamber, in combination with additional means for admitting fluidizing gas at a controlled rate to points situated in said second chamber beneath said passageways for fluidizing the solids.

14. Apparatus for transferring heat between a gas and a heat transfer well comprising, in combination: an inner, upright riser tube of restricted cross sectional area for the upflow of said gas at high velocity; an outer down-flow tube substantially concentric with said riser tube defining therewith an annular down-flow chamber of relatively greater cross sectional area than said riser tube and containing said heat transfer wall; wall means at the upper ends of said tubes enclosing a disengaging space communicating with both said tubes and having a cross sectional area greater than that of the riser tube; outlet means for discharging gas from said disengaging chamber; means for supplying heat transmitting material in the form of finely divided solids to the bottom of the the riser tube; means for supplying said gas to the bottom of said riser tube at a rate sufficient to cause upflow of gas through the riser tube at a high velocity to carry said solids progressively upwards as a dispersed suspension, whereby heat exchange is effected between said gas and said solids; gas admission means for admitting fluidization gas to the down-flow chamber for maintaining the descending solids in the state of a fluidized bed in contact with said heat transfer wall, whereby heat exchange is effected between said solids and said wall; and means for withdrawing said solids from the bottom of the down-flow chamber.

15. Apparatus for transferring heat between a gas and a process stream comprising, in combination: an inner, upright riser tube of restricted cross sectional area for the upflow of said gas at high velocity; an outer down-flow tube substantially concentric with the said riser tube defining therewith an annular down-flow chamber of relatively greater cross sectional area than said riser tube, the height of said tubes being greater than ten times the square root of the effective cross sectional area of said down-flow chamber; flow tubes for the passage of said process stream situated throughout at least the major part of the height of said down-flow chamber; wall means at the upper ends of said tubes enclosing a disengaging space communicating with both said tubes and having a cross sectional area greater than that of the riser tube; outlet means for discharging gas from said disengaging space, said outlet means including a gas-solids separating device; a dip leg from said separating device extending into said annular down-flow chamber below the upper end of the riser tube; means for transferring heat transmitting material in the form of finely divided solids from the bottom of the down-flow chamber to the bottom of the riser tube; means for regulating the rate of the said transfer of heat transmitting material; means for supplying said gas to the bottom of the riser tube at a rate sufficient to cause upflow of gas through the riser tube at a high velocity to carry said solids progressively upwards as a dispersed suspension, whereby heat exchange is effected between said gas and said solids; and means for admitting fluidization gas to the down-flow chamber at a rate sufficient to maintain the descending solids in the state of a turbulent fluidized bed in contact with said flow tubes, whereby heat exchange is effected between said solids and said flow tubes.

References Cited in the file of this patent

UNITED STATES PATENTS

| Number | Name | Date |
| --- | --- | --- |
| 2,493,498 | Perry | Jan. 3, 1950 |
| 2,493,911 | Brandt | Jan. 10, 1950 |
| 2,520,637 | Henwood | Aug. 29, 1950 |
| 2,550,722 | Rollman | May 1, 1951 |
| 2,610,842 | Schoenmakers et al. | Sept. 16, 1952 |
| 2,614,028 | Schaumann | Oct. 14, 1952 |

FOREIGN PATENTS

| Number | Country | Date |
| --- | --- | --- |
| 587,774 | Great Britain | Feb. 21, 1944 |